(12) United States Patent
Zhao

(10) Patent No.: US 8,534,756 B2
(45) Date of Patent: Sep. 17, 2013

(54) CHILD CAR SEAT

(75) Inventor: Guang-Hui Zhao, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 0 days.

(21) Appl. No.: 12/844,542

(22) Filed: Jul. 27, 2010

(65) Prior Publication Data

US 2011/0133532 A1    Jun. 9, 2011

(30) Foreign Application Priority Data

Dec. 7, 2009 (CN) .......................... 2009 1 0211958

(51) Int. Cl.
*A47D 1/10* (2006.01)
*A47D 15/00* (2006.01)

(52) U.S. Cl.
USPC ...................................... 297/250.1; 297/484

(58) Field of Classification Search
USPC ......... 297/486, 482, 250.1, 488, 410, 256.15, 297/465, 466, DIG. 6, 216.11, 484
See application file for complete search history.

(56) References Cited

U.S. PATENT DOCUMENTS

| 4,678,205 | A | * | 7/1987 | Wold | 280/808 |
|---|---|---|---|---|---|
| 5,108,152 | A | * | 4/1992 | Reilly et al. | 297/482 |
| 5,580,133 | A | * | 12/1996 | Knox et al. | 297/464 |
| 6,378,950 | B1 | * | 4/2002 | Takamizu et al. | 297/484 |
| 6,623,074 | B2 | * | 9/2003 | Asbach et al. | 297/250.1 |
| 7,390,064 | B2 | * | 6/2008 | Horton et al. | 297/472 |
| 7,954,895 | B2 | * | 6/2011 | Freeman et al. | 297/250.1 |
| 2001/0013719 | A1 | * | 8/2001 | Carine et al. | 297/484 |
| 2008/0023993 | A1 | * | 1/2008 | Vertegaal | 297/250.1 |
| 2009/0151079 | A1 | | 6/2009 | Espindola | |
| 2009/0256404 | A1 | * | 10/2009 | Strong et al. | 297/216.11 |
| 2010/0201170 | A1 | * | 8/2010 | Brandl et al. | 297/250.1 |

FOREIGN PATENT DOCUMENTS

| EP | 1123833 A2 | 8/2001 |
|---|---|---|
| JP | 2009006913 A | 1/2009 |
| WO | 2006/129112 A2 | 12/2006 |

* cited by examiner

*Primary Examiner* — Milton Nelson, Jr.
(74) *Attorney, Agent, or Firm* — Christensen O'Connor Johnson Kindness PLLC

(57) ABSTRACT

A child car seat includes a seat body, a headrest connected to the seat body, a seat belt disposed on the seat body, and a shoulder pad unit. The shoulder pad unit includes a shoulder pad connected to the seat belt, and a connecting strap interconnecting the shoulder pad and the headrest.

14 Claims, 6 Drawing Sheets

CHILD CAR SEAT

CROSS-REFERENCE TO RELATED APPLICATION

This application claims priority of Chinese Application No. 200910211958.4, filed on Dec. 7, 2009.

BACKGROUND OF THE INVENTION

1. Field of the Invention

The invention relates to a child car seat, more particularly to a child car seat that is adjustable for children of different sizes.

2. Description of the Related Art

Referring to FIGS. 1 and 2, U.S. Pat. No. 6,471,298 discloses a car safety seat that comprises a shoulder pad 31, a seat belt 32, a connecting strap 33, a backrest 34 formed with a through hole 341, and a connecting member 35. The seat belt 32 extends movably through the through hole 341. The shoulder pad 31 is sleeved movably on a portion of the seat belt 32. The connecting strap 33 has an end portion connected co-movably to the shoulder pad 31 and an opposite end portion extending movably through the through hole 341 of the backrest 34 and connected to the seat belt 32 and the connecting member 35 behind the backrest 34. During a length adjustment of the seat belt 32, the seat belt 32 and the connecting strap 33 can be moved together such that the shoulder pad 31 is moved simultaneously relative to the seat belt 32 so as to accommodate children of different sizes.

SUMMARY OF THE INVENTION

One aspect of the present invention is to provide a child car seat having a shoulder pad that can be adjusted together with a headrest of the car seat for accommodating children of different sizes.

Accordingly, a child car seat of the present invention includes a seat body, a headrest connected to the seat body, a seat belt disposed on the seat body, and a shoulder pad unit. The shoulder pad unit includes a shoulder pad connected to the seat belt, and a connecting strap interconnecting the shoulder pad and the headrest.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
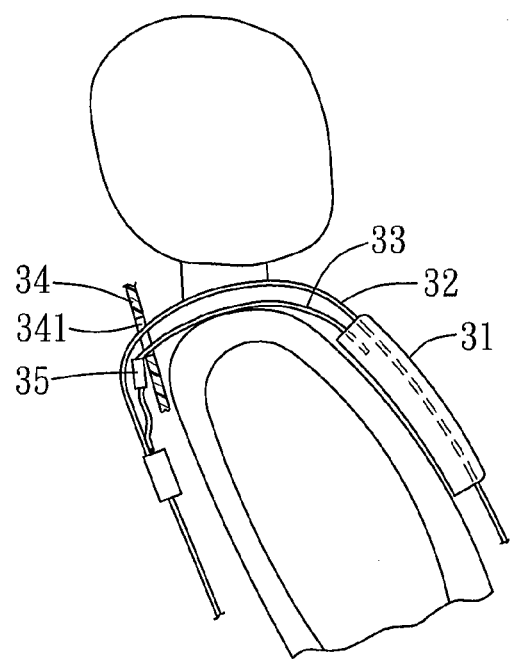
FIGS. 1 and 2 are fragmentary schematic sectional views of a conventional car safety seat disclosed in U.S. Pat. No. 6,471,298 and accommodating children of different sizes.
Figure 2:
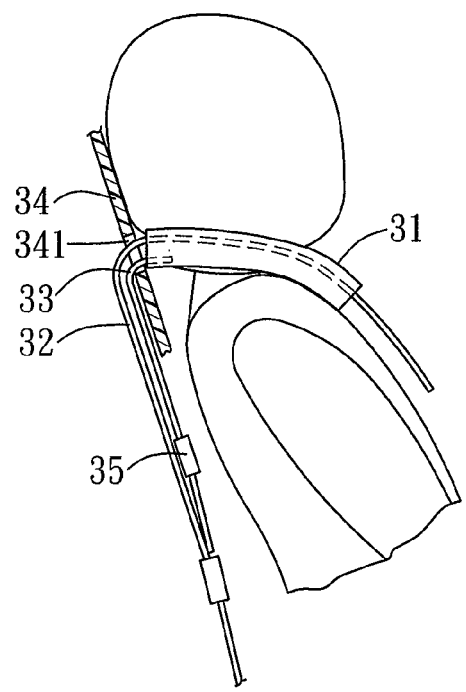
Figure 3:
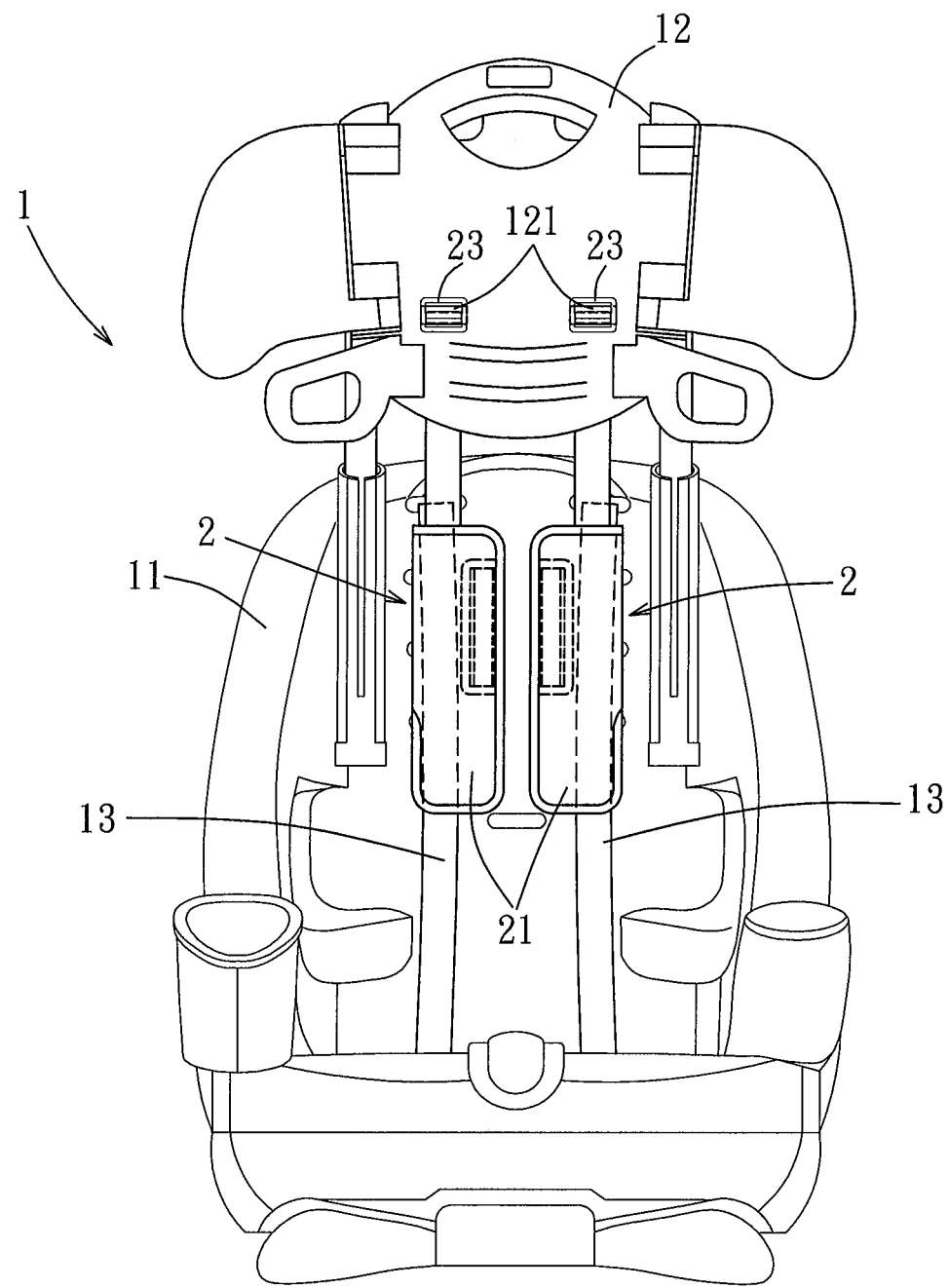
FIG. 3 is a front view of a preferred embodiment of a child car seat according to the present invention.
Figure 4:
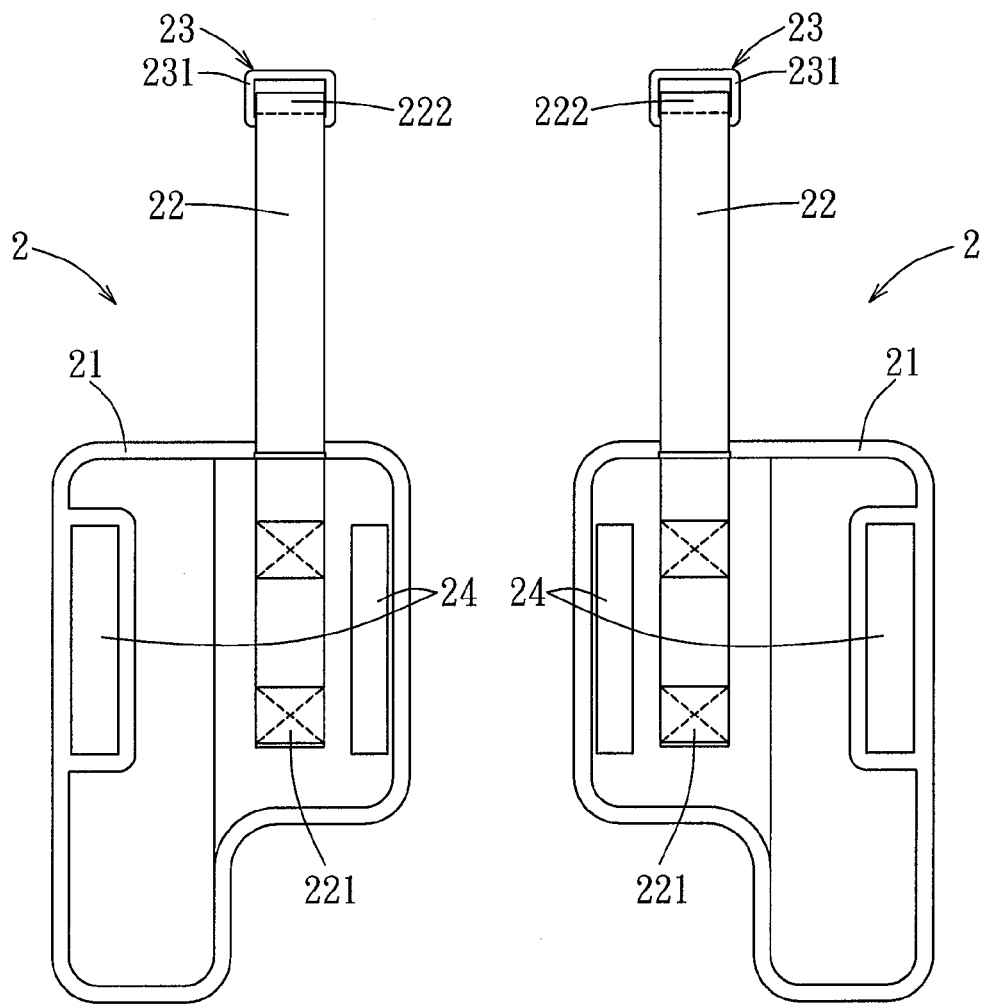
FIG. 4 is a schematic view of a shoulder pad unit of the preferred embodiment.
Figure 5:
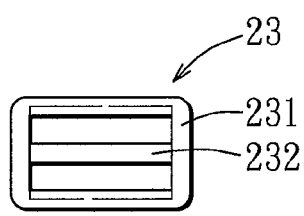
FIG. 5 is a schematic view of a positioning member of the preferred embodiment.
Figure 6:
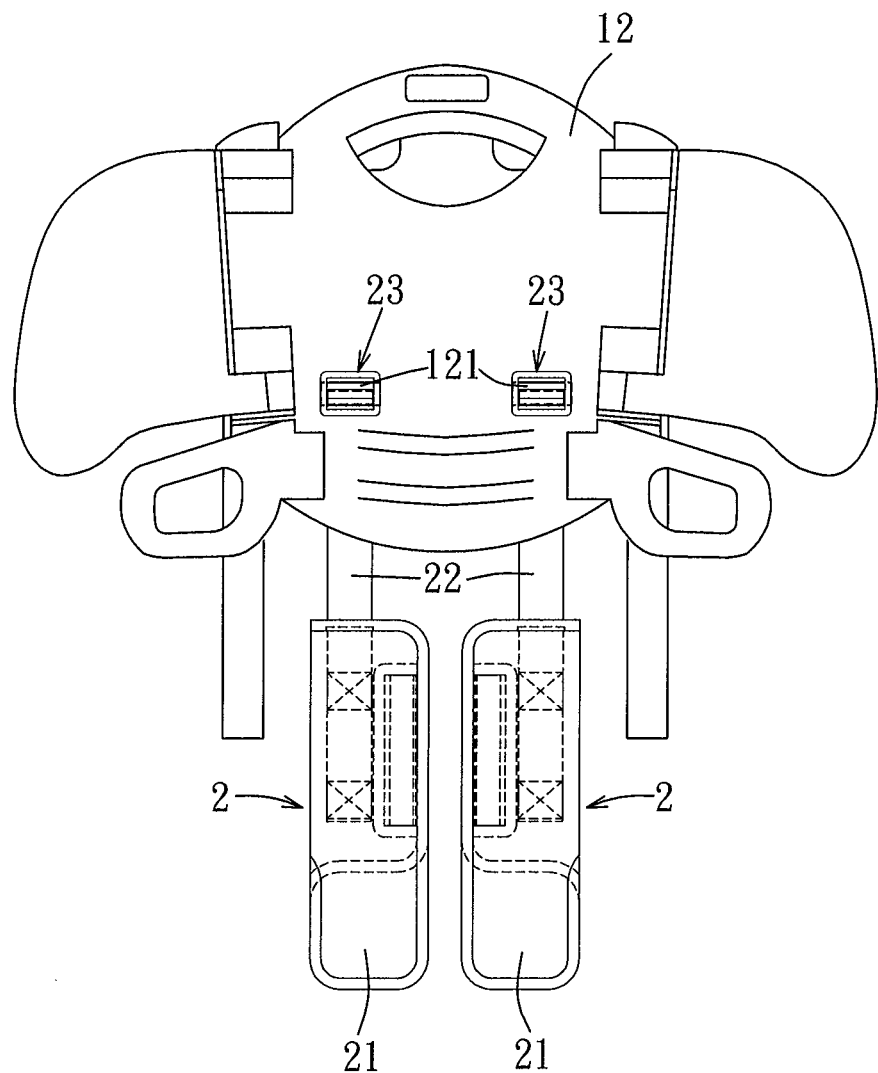
FIG. 6 is a front view of a headrest and the shoulder pad unit of the preferred embodiment.
Figure 7:
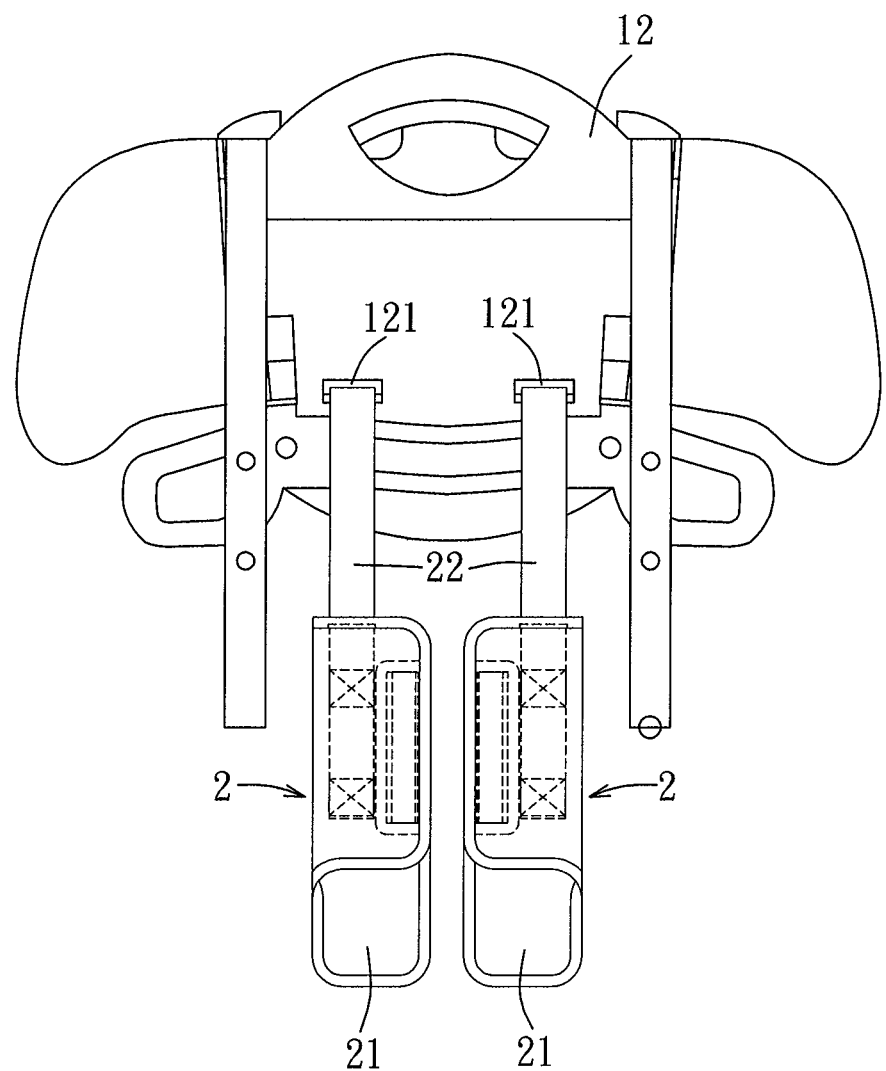
FIG. 7 is a rear view of the headrest and the shoulder pad unit of the preferred embodiment.
Figure 8:
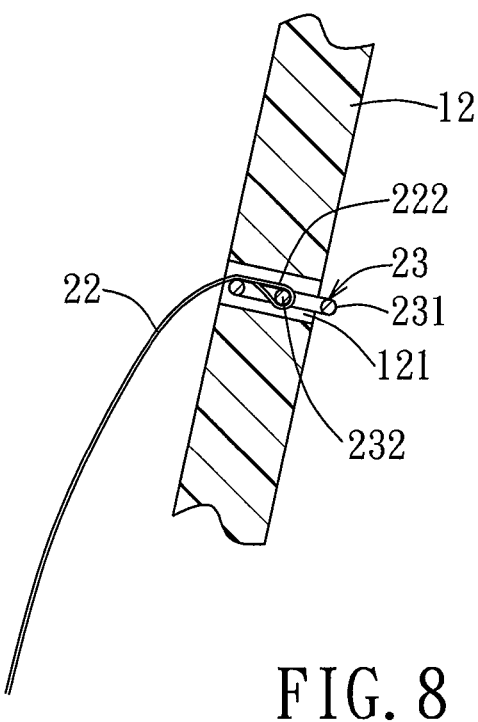
FIG. 8 is a fragmentary sectional view of the headrest, illustrating the positioning member at a separable orientation.
Figure 9:
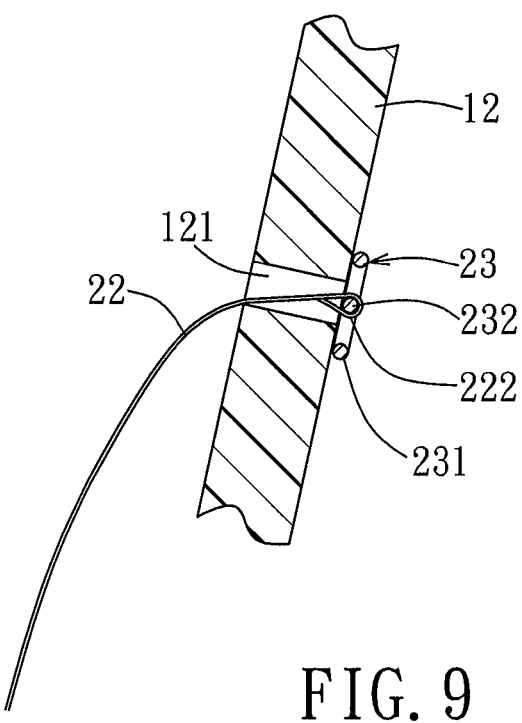
FIG. 9 is a view similar to FIG. 8, but illustrating the positioning member at an engaging orientation.

As shown in FIGS. 3 to 5, a preferred embodiment of a child car seat of the present invention is adapted to be used in a car (not shown). The child car seat 1 comprises a seat body 11, a headrest 12, two seat belts 13, and two shoulder pad units 2. The headrest 12 is connected to the seat body 11, is formed with two through holes 121 spaced apart from each other in a left-right direction, and is movable relative to the seat body 11 along a vertical direction so as to be adapted to children of different sizes. The seat belts 13 are provided, on the seat body 11 for fastening the child seated on the seat body 11.

The shoulder pad units 2 are connected co-movably to the headrest 12. Each of the shoulder pad units 2 includes a shoulder pad 21 connected to a respective one of the seat belts 13, and a connecting strap 22 interconnecting the shoulder pad 21 and the headrest 12. The connecting strap 22 of each of the shoulder pad units 2 extends through a respective one of the through holes 121 in the headrest 12, and has a first end 221 that is sewn fixedly to a corresponding shoulder pad 21, and a second end 222 that is opposite to the first end 221 and that extends through the respective one of the through holes 121 of the headrest 12.

Preferably, each of the shoulder pad units 2 further includes a hook-and-loop fastener unit 24 provided on two ends of the corresponding shoulder pad 21 for fastening the two ends thereof together to form a sleeve that is sleeved on a portion of the corresponding seat belt 13. It should be noted that each hook-and loop fastener unit 24 can be implemented using a releasable buckle mechanism in other embodiments of the invention.

Each of the shoulder pad units 2 further includes a positioning member 23 connected to the second end 222 of a corresponding connecting strap 22 and engaging removably the headrest 12 so as to prevent separation of the second end 222 of the corresponding connecting strap 22 from the headrest 12 through the corresponding through hole 121.

Further referring to FIGS. 5 to 9, each of the positioning members 23 includes a frame body having an outer segment 231 and an intermediate segment 232 extending across the outer segment 231. The second end 222 of each of the connecting straps 22 extends through the outer segment 231 of a respective one of the positioning members 23, and is folded and sewn to form a loop around a corresponding intermediate segment 232. Each of the positioning members 23 has a cross-sectional size larger than the respective through hole 121 in the headrest 12, and a thickness smaller than a dimension of the respective through hole 121.

Each of the positioning members 23 is rotatable relative to the corresponding one of the connecting straps 22 between a separable orientation (see FIG. 8), where the positioning member 23 is extendable through the respective through hole 121 together with the second end 222 of the corresponding one of connecting straps 22, and an engaging orientation (see FIG. 9), where the positioning member 23 abuts against a side surface of the headrest 12 opposite to the shoulder pad 21 so as to arrest separation of the second end 222 of the corresponding connecting strap 22 from the headrest 12 through the respective through hole 121.

When installing the shoulder pad units 2 onto the headrest 12, each of the positioning members 23 has to be rotated to the separable orientation and passed through the corresponding one of the through holes 121 together with the second end 222 of the corresponding one of the connecting straps 22 from a rear side surface of the headrest 12 to a front side surface of the headrest 12. Afterwards, each of the positioning members 23 is rotated from the separable orientation to the engaging orientation so as to abut against the front side surface of the headrest 12 to thereby arrest separation of the positioning member 23 and the second end 222 of the corresponding connecting strap 22 from the headrest 12. It should be further noted that, in other embodiments of this invention, the positioning member 23 and the second end 222 of the corresponding connecting strap 22 may be passed through the corresponding through hole 121 from the front side surface of the headrest 12 to the rear side surface of the headrest 12 so as to abut against the rear side surface when rotated to the engaging orientation.

Furthermore, the positioning members 23 may be configured as releasable buckle mechanisms provided on the side surface of the headrest 12 and the second ends 222 of the connecting straps 22 for arresting separation of the second ends 222 of the connecting straps 22 from the headrest 12 through the through holes 121.

During an emergency brake action of the car, the child seated on the child car seat of the invention has a tendency to move forwardly due to inertia. Since the child is in direct contact with the shoulder pads 21 instead of the seat belts 13, and since the connecting straps 22 are connected fixedly to the shoulder pads 21, the forward movement of the child can be limited to a length of each of the connecting straps 22 to avoid severe injury to the child.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A child car seat comprising:
   a seat body;
   a headrest connected to said seat body;
   a first seat belt disposed on a first side of said seat body;
   a second seat belt disposed on a second opposite side of said seat body;
   a first shoulder pad unit on said first side, wherein said first shoulder pad unit includes a first shoulder pad that is connected to said first seat belt and is unconnected to said second seat belt, and a first connecting strap that interconnects said first shoulder pad and said headrest; and
   a second shoulder pad unit on said second side, wherein said second shoulder pad unit includes a second shoulder pad that is connected to said second seat belt and is unconnected to said first seat belt, and a second connecting strap that interconnects said second shoulder pad and said headrest;
   wherein said headrest is vertically movable with respect to said seat body, and each of said shoulder pad units is connected co-movably with the headrest as the headrest moves vertically.

2. The child car seat as claimed in claim 1, wherein said headrest is formed with a first and second through hole, one of said connecting straps having a first end that is connected fixedly to one of said shoulder pads, and a second end that is opposite to said first end and that extends through one of said through holes, one of said shoulder pad units further including a positioning member that is connected to said second end of one of said connecting straps and that engages removably one of said through holes so as to arrest separation of said second end of one of said connecting straps from said headrest through one of said through holes.

3. The child car seat as claimed in claim 2, wherein said positioning member has a cross-sectional size larger than one of said through holes in said headrest, and a thickness smaller than a dimension of one of said through holes.

4. The child car seat as claimed in claim 3, wherein said positioning member is rotatable relative to one of said connecting straps between a separable orientation, where said positioning member is extendable through one of said through holes together with said second end of one of said connecting straps, and an engaging orientation, where said positioning member abuts against a side surface of said headrest opposite to one of said shoulder pads so as to arrest separation of said second end of one of said connecting straps from said headrest through one of said through holes.

5. The child car seat as claimed in claim 4, wherein said positioning member includes a frame body that has an outer segment and an intermediate segment extending across said outer segment, said second end of one of said connecting straps extending through said outer segment and being folded and sewn to form a loop around said intermediate segment.

6. The child car seat as claimed in claim 4, wherein said first end of one of said connecting straps is sewn to one of said shoulder pads.

7. The child car seat as claimed in claim 4, wherein one of said shoulder pads is sleeved on a portion of one of said seat belts.

8. The child car seat as claimed in claim 7, wherein one of said shoulder pad units further includes a hook-and-loop fastener unit provided on two ends of one of said shoulder pads for fastening releasably said two ends of one of said shoulder pads together to form a sleeve that is sleeved on one of said seat belts.

9. A combination of a shoulder pad assembly and a child car seat, said child car seat comprising a seat body and a seat belt disposed on said seat body, said shoulder pad assembly being mounted on said child car seat and comprising:
   a headrest connected movably to said seat body; and
   a shoulder pad unit including a shoulder pad that is connected to said seat belt, and a connecting strap that is fixedly attached at one end to said shoulder pad and said connecting strap is prevented from separating at a second end from said headrest, wherein said headrest is vertically movable with respect to said seat body, and said shoulder pad unit is connected co-movably with said headrest as the headrest moves vertically, and an upper end of said seat belt overlaps with a lower end of said connecting strap.

10. A shoulder pad assembly and a child car seat as claimed in claim 9, wherein said headrest is formed with a through hole, said connecting strap having a first end that is connected fixedly to said shoulder pad, and a second end that is opposite to said first end and that extends through said through hole, said shoulder pad unit further including a positioning member that is connected to said second end of said connecting strap, that engages removably said through hole so as to arrest separation of said second end of said connecting strap from said headrest through said through hole, and has a cross-sectional size larger than said through hole in said headrest, and a thickness smaller than a dimension of said through hole, said positioning member being rotatable relative to said connecting strap between a separable orientation, where said positioning member is extendable through said through hole together with said second end of said connecting strap, and an engaging orientation, where said positioning member abuts against a side surface of said headrest opposite to said shoulder pad so as to arrest separation of said second end of said connecting strap from said headrest through said through hole.

11. A shoulder pad assembly and a child car seat as claimed in claim 10, wherein said first end of said connecting strap is sewn to said shoulder pad.

12. A shoulder pad assembly and a child car seat as claimed in claim 10, wherein said positioning member includes a frame body that has an outer segment and an intermediate segment extending across said outer segment, said second end of said connecting strap extending through said frame body, and being folded and sewn to form a loop around said intermediate segment.

13. A shoulder pad assembly and a child car seat as claimed in claim 10, wherein said shoulder pad unit is adapted to be sleeved on a portion of the seat belt.

14. A shoulder pad assembly and a child car seat as claimed in claim 13, wherein said shoulder pad unit further includes a hook-and-loop fastener unit provided on two ends of said shoulder pad for fastening releasably said two ends of said shoulder pad together to form a sleeve that is adapted to be sleeved on the seat belt.

\* \* \* \* \*